United States Patent [19]

Perry

[11] 4,379,581

[45] Apr. 12, 1983

[54] TAKE-OUT TONG ASSEMBLY

[75] Inventor: Jack I. Perry, Sylvania, Ohio

[73] Assignee: Owens-Illinois, Inc., Toledo, Ohio

[21] Appl. No.: 206,765

[22] Filed: Nov. 14, 1980

[51] Int. Cl.³ .................... B66C 1/42; B66C 1/28
[52] U.S. Cl. .................... 294/115; 294/87 R; 294/118
[58] Field of Search .............. 294/115, 106, 87 R, 294/87.22, 87.24, 88, 118

[56] References Cited

U.S. PATENT DOCUMENTS 3,790,205 2/1974 Wenz .................................. 294/118
3,948,552 4/1976 Hamrick ............................ 294/118

*Primary Examiner*—James B. Marbert

*Attorney, Agent, or Firm*—D. T. Innis; Myron E. Click; David H. Wilson

[57] ABSTRACT

Apparatus for taking newly formed glass containers from a blow mold and transferring the containers to a dead plate wherein the take-out tongs for engaging the containers are mounted on a pair of holders that are pivoted like scissors relative to each other. A piston motor is pneumatically driven in one direction to cause the tongs and holders to close, and a spring, urging the piston in the opposite direction effects the opening of the tongs. When the tongs are open, the connection between the piston rod and the holders is a toggle linkage when the links are in a straight line preventing "winking" movement of the tongs toward closing by the fact of the toggle arrangement. Thus machine air closes the tongs and a fairly light spring force opens them.

4 Claims, 2 Drawing Figures

TAKE-OUT TONG ASSEMBLY

BACKGROUND OF THE INVENTION

In the operation of the conventional Hartford IS glass forming machine as disclosed in U.S. Pat. No. 1,843,285 dated Feb. 2, 1932 in the name of Ingle, there is shown a mechanism which takes the formed ware from the blow mold, where they have been formed into their final shape, and transfers them through an arc in a vertical plane to a dead plate where the ware is cooled by air being impinged on the bottom of the container. This mechanism for removing the ware or bottles from the blow molds and placing them onto the dead plate is termed a "take-out" mechanism. Generally speaking, the take-out mechanism is operated by a reciprocable piston motor whose piston rod is formed with a rack at one end, this rack in turn engages a pinion which drives the take-out mechanism. The take-out mechanism will further include an arm which extends outwardly from the shaft on which the pinion would normally be fixed. This arm has a tong housing connected to its extending end. The housing in turn normally either carries or supports a vertical piston and rod arrangement with a bottle-grasping tong mechanism being carried at the lower end of the housing. The tong mechanism itself is composed of gripping members which are opened and closed by the vertical reciprocation of a small piston and its rod. In the cycle of operation of the glass forming machine, the tong mechanism is operated at about the time the blow head has completed its function and has been moved from above and in overlying relationship to the neck portion of the formed bottle. At the same time the blow molds are opened, the take-out mechanism, having the requisite number of tongs, removes the number of bottles which are present at the blow molding station. After the blow molds have been opened, the tong mechanism, which is open, moves into position above the finish or neck of the bottle, and the piston is actuated so that the grasping tongs actually close about the neck of the bottle and beneath the transfer ring formed on the bottle. With the tongs closed, or as closed as they are permitted to be, they will support the newly formed bottles by their necks and the bottles are lifted from the bottom plates of a blow mold and are carried to a position overlying the cooling dead plate. At this point, the tongs may remain closed for a period of time while the cooling air is blown against the bottom of the bottle or; as the bottle arrives to its position just above the dead plate, the tongs may be opened to release the bottle to the dead plate. The tongs are then retracted to their initial position in anticipation of the next cycle of their operation. The ware or bottle container is moved from the dead plate to a moving machine conveyor by what is known as a "sweepout" mechanism forming no part of the present invention.

REFERENCE TO PRIOR ART

A recent prior art patent in this field may be found in U.S. Pat. No. 3,790,205 issued to William Wenz and dated Feb. 5, 1974. This particular patent discloses a take-out tong mechanism in which a cylinder carrying a piston and piston rod is mounted on a take-out arm (not shown). The cylinder carries with it a sleeve and in turn a pair of spaced-apart pivot-supporting members through which a shaft passes. Intermediate the two sides, and pivotally supported by the shaft, are a pair of tong holders.

With reference to FIGS. 3 and 4 of this abovementioned patent, it can be seen that reciprocation of the piston rod from the position shown in FIG. 3 to the position shown in FIG. 4 results in the opening of the actual tong-grasping members. It should be noted that the holder designated 34 is formed integral with the connecting arm designated 27 while the tong holder 33 is intergral with the arm 26. The two arms 26 and 27 in turn are connected by links 24 and 25 to the lower end of the piston rod. The configuration of the mechanism, and with particular reference to FIG. 1 thereof, shows that a spring is normally biasing the piston rod 23 to the position shown in FIG. 4, at which time the tong-grasping members are actually open. Upon actuation of the piston, the rod 23 will be moved to the position shown in FIG. 3, at which time the tongs will be closed to the extent necessary to effectively pick up a formed container by its neck or by its transfer ring. It should be kept in mind that most transfer mechanisms of the type which are going to touch the glass while it is still in a fairly warm or hot state, are usually formed of a material which is nonmetallic and which, therefore, has a less chilling effect than metal members might have. Although the finish portion of the container is the least sensitive to the production of checks through thermal checking, it is, however, an important consideration that the tongs themselves be made of or faced with a material which has a very relatively low thermal conductivity and, therefore, a low chilling effect when contacting the hot glass. Furthermore, it is desirable not to grip the container tightly as might occur if spring-biased or spring-loaded members were formed such that they would actually grasp the container when in closed position.

It will be noted from the prior art of Wenz that the tongs themselves are prevented from actually closing against each other and it should be pointed out that the neck of the container in relation to the size of the opening produced by the tongs is such that when the tongs have been moved to their closed position, as shown in FIG. 3, the transfer ring of the container will be above the opening formed by the tongs 37 and 38. However, the diameter of the opening produced by the closed tongs is such that it is still smaller than the transfer ring diameter, thus transfer of the containers is easily accomplished by manipulation of the tongs. Again, it should be pointed out that the tongs are not intended to do any more than support the bottle generally through vertical and some horizontal movement, but again the tongs and the tong holders during the transfer motion always remain essentially vertical in their orientation. Thus there is little tendency for the bottle to tilt or sway about its vertical axis in relation to the axis of the take-out tongs themselves during transfer. It is important, however, that with plural containers being handled, they should not swing and touch each other.

SUMMARY OF THE INVENTION

The present invention relates to apparatus for taking out newly formed containers from the blow molds and placing them at the dead plate location. The take-out tongs that grasp the newly formed ware are pivoted like scissors and are opened by the action of a spring acting through the links which connect the upper ends of the tongs to the lower end of a piston rod. When the tongs are at their fully opened position, the links will be in a horizontal line. When the tongs are moved to the position overlying the hot containers at the mold position in preparation to be closed, the inertia of the tongs due to the motion will not be such as to cause any sort of a closing movement and closing will be initiated only at such time as the piston which operates the piston rod moves under the influence of air pressure imposed beneath the piston to move the piston vertically upward against the spring.

By way of background, existing tong assemblies such as that shown in U.S. Pat. Nos. 3,790,205 and 2,277,828 rely on a spring as the means to provide the force required to open the tongs. The force required to close the tongs is machine operating air pressure. As the tong assembly moves through its arc to the mold, it is decelerated to a stop. This stopping action produces forces through the tong linkage which work against the spring reload. At high speed, this causes the tongs to close or "wink" during the stopping action with the possibility of the tongs striking the finish of the containers in the mold prematurely. Increasing spring pressure can help but is limited because operating air pressure must be able to overcome this spring force when it is used to close the tongs.

The present invention provides for a minimum spring force working through a locking toggle design. With this design no inertial forces can act against the spring. The spring force need only be great enough to overcome friction. This reduction in spring force also allows for better closing action with the same operating air pressure.

With the foregoing in view, reference may now be had to the drawings and the detailed description thereof to follow.

DETAILED DESCRIPTION OF THE DRAWINGS

Figure 1:
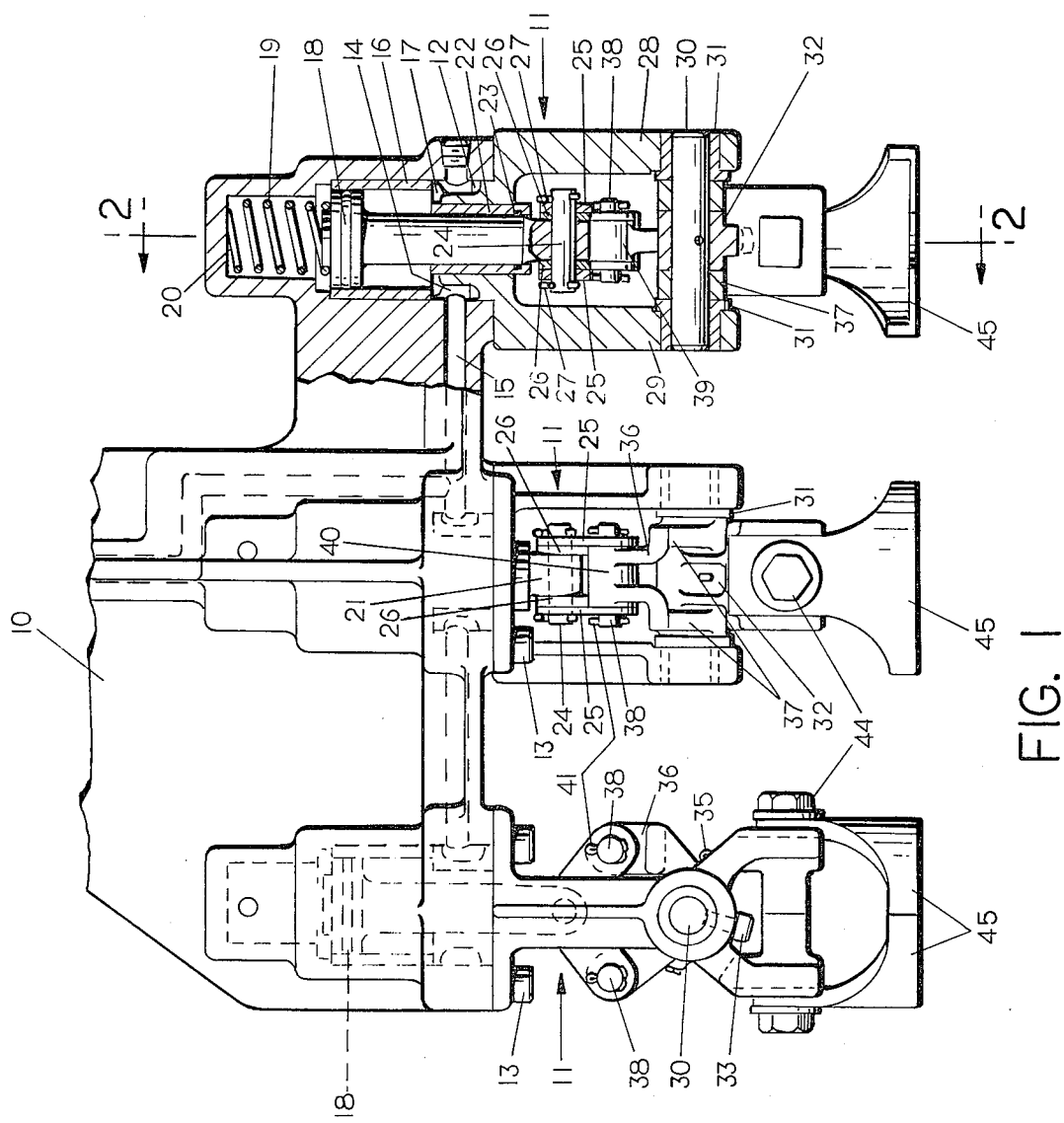
FIG. 1 is a side elevational view of a triple take-out tong head assembly including tongs which utilize the tong-actuating mechanism of the invention.

With reference to FIG. 1, there is shown a cylinder housing 10 in the form of a casting which is transported at the forward end of the conventional takeout arm. This housing 10 serves as the carrier for three hanger assemblies 11. The hanger assemblies 11 seat within downwardly open cylinders 12 and are fixed thereto by cap screws 13. The upper ends of the hanger assemblies 13 are provided with an annular groove 14 which communicates with passageway 15 in the cylinder housing 10. The groove 14 also communicates with the interior of a sleeve 16 positioned within the cylinder 12 through cut-outs 17. The sleeve 16 serves as the guiding cylinder for a vertically reciprocable piston 18. The cylinder housing 10 immediately above the piston 18 is provided with a vertically extending chamber 19 within which a generally spiral compression spring 20 is confined. The spring 20 serves as a biasing means with respect to the piston 18 and provides a downward force to the top of the piston. A rod 21 extends downward from the piston 18 and may actually be formed integral therewith. The rod 21 is guided in the hanger assembly 11 by a sleeve bearing 22 retained therein and a seal 23 is provided between the bearing and the piston rod 21. The lower end of the rod 21 has a horizontal passage therethrough, through which a pin 24 extends. The pin 24 at each end carries one end of a pair of links 25 and 26. The links 25 and 26 are retained on the pin by a cotter pin 27 at each end of the pin 24.

The hanger assembly 11, at its lower end, is in the form of a pair of downwardly extending, spaced-apart, support arms 28 and 29 between which extends a shaft 30. The shaft 30 is rotatable about its longitudinal axis and has its ends supported in bushings 31 that serve as bearings mounted in the arms 28 and 29 of the hanger assembly 11. Intermediate its length, the shaft 30 carries a tong holder 32. The holder 32 has a cap screw 33 threaded through the side thereof into abutting relationship with a flat 34 formed on the shaft 30. The screw thus serves as a set screw to maintain the tong holder 32 in non-rotative engagement with the shaft 30. In addition, the shaft has a passage extending diametrically therethrough in alignment with openings formed in the holder 32 serving as the keyway for a cotter pin 35. The cotter pin 35 and the set screw 33 are a somewhat redundant system to prevent the holder rotating relative to the shaft and also to keep the shaft from coming out of the hanger assembly 11. A second tong holder 36 is mounted on the shaft 30 for relative rotation with respect thereto. The mounting of the second tong holder is through spaced bosses 37, which span the portion of the holder 32 which is positioned on the shaft 30. Both of the holders 32 and 36 have horizontal pins 38 through their upper ends 39 and 40 respectively. As can be seen in FIG. 1, the upper end 39 of the holder 32 is about as wide as the lower end of the piston rod 21. The upper end 40 of the holder 36 is slightly larger than end 39 of holder 32. The pins 38 which extend through the upper ends 39 and 40 of the holders also extend through the ends of links 26 and 25 respectively. Cotter pins 41 at each end of the pins 38 will serve to retain the links on the pins. Both of the holders 32 and 36 are formed with rectangular abutments 42 and 43 respectively. These abutments serve to limit the extent of closing movement of the holders under the influence of air under pressure which is introduced through the passage 15 to raise the piston 18 against the spring 20. The lower end of each holder is provided with a threaded opening into which a collar screw 44 is threaded. The collar screws 44 serve to hold tongs 45 to the ends of the holders 32 and 36. The tongs 45 are generally C-shaped in cross-section when viewed from below, with the circle that a pair describe when in juxtaposed position, as in FIG. 1, being of a size generally comparable to the neck size of the containers to be handled. The opening may be slightly larger than the neck diameter, but certainly must be smaller than the diameter of the transfer ring that is formed at the base of the neck of the container.

Figure 2:
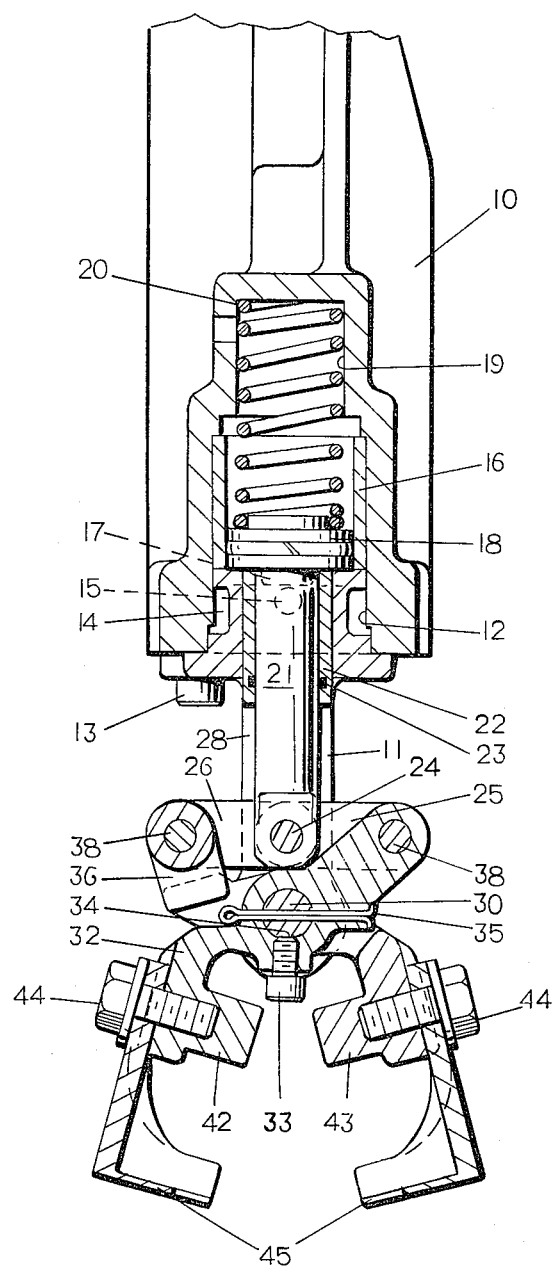
FIG. 2 is a cross-sectional view taken at line 2—2 of FIG. 1, but showing the tong mechanism in open position.

One important consideration of the above-described apparatus is that the links 25 and 26, when the piston rod 21 is in the fully down position as illustrated in FIG. 2, are in essentially a straight, horizontal line. With such an arrangement, there can be no movement of the tong holders toward each other. Therefore, the tongs cannot "wink" when they are open and are moved into position to grasp the neck or finish of the container. "Winking" can result in premature touching of a tong with the container and can result in a container being tipped over or a container rim being thermally checked or scarred by the contact with the tong.

It should also be noted that with respect to FIG. 1, two of the holders are shown in the same attitude while the third is turned 90° with respect to the others. This is done on purpose to allow for better clearance at the blow molds for the tong assembly on a triple operation.

It should be noted that the hanger assemblies 11 are made such that they can be turned through 90° by removing the mounting screws 13 and repositioning the hangers. Each is held by a pair of screws at diagonally opposed corners.

I claim:

1. In glassware take-out mechanism wherein a pair of opposed tongs are moved into operative relationship with respect to the neck or finish of a glass container and closed about the neck for lifting the container by the neck and transferring the container to a machine dead plate, the improvement in the tong operating mechanism comprising:
   a cylinder housing;
   a piston positioned in said cylinder housing having a rod extending vertically downward therefrom;
   a bifurcated hanger assembly extending generally parallel to said piston rod and at either side thereof;
   a shaft extending between the lower ends of said hanger assembly;
   a pair of tong holders mounted on said shaft and pivotally supported with respect to the axis of said shaft;
   a compression spring biasing said piston in a downward direction into its lowermost positions;
   at least a pair of equal length links pivotally connected to and extending from the lower end of said piston rod to the upper ends of said tong holders respectively, said links describing a straight line when the piston rod is in its fully extended, lowermost position.

2. The apparatus of claim 1 wherein said shaft is rotatable with respect to said hanger assembly, and one of said tong holders is fixed to said shaft.

3. The apparatus of claim 1, further including abutment means carried by said tong holders for limiting the relative movement of said holders in the direction toward each other.

4. The apparatus of claim 1, including means connected to said cylinder housing for feeding air under pressure beneath said piston.

* * * * *